United States Patent
Okamoto

(10) Patent No.: US 6,179,348 B1
(45) Date of Patent: Jan. 30, 2001

(54) TUBE-CONNECTING FITTING AND FITTING STRUCTURE

(76) Inventor: Kimio Okamoto, No. 12-11, Bingohigashi 6-Chome, Kasukabe, Saitama (JP)

(*) Notice: Under 35 U.S.C. 154(b), the term of this patent shall be extended for 0 days.

(21) Appl. No.: 09/272,155

(22) Filed: Mar. 19, 1999

(30) Foreign Application Priority Data

Dec. 15, 1998 (JP) .................................................. 10-356329

(51) Int. Cl.[7] .............................. F16L 33/22; F16L 19/04
(52) U.S. Cl. ........................ 285/334.5; 285/354; 285/386
(58) Field of Search ................................ 285/334.5, 354, 285/405, 386

(56) References Cited

U.S. PATENT DOCUMENTS

| 431,816 | * | 7/1890 | Lomasney | 285/334.5 |
| 509,743 | * | 11/1893 | Lane | 285/334.5 |
| 771,682 | * | 10/1904 | Sussman | 285/334.5 |
| 1,880,638 | * | 10/1932 | Wood et al. | 285/334.5 |
| 1,925,937 | * | 9/1933 | Schultis | 285/334.5 |
| 2,445,702 | * | 7/1948 | Weyenberg et al. | 285/334.5 |
| 3,380,764 | * | 4/1968 | Wilson | 285/334.5 |
| 3,501,171 | * | 3/1970 | Baron | 285/334.5 |
| 4,133,565 | * | 1/1979 | Shutt | 285/334.5 |
| 5,439,259 | * | 8/1995 | Taga et al. | 285/334.5 |

FOREIGN PATENT DOCUMENTS

| 1091 | * | 6/1889 | (CH) | 285/354 |
| 1238867 | * | 7/1960 | (FR) | 285/334.5 |
| 351829 | * | 7/1931 | (GB) | 285/354 |
| 3229089 | | 10/1991 | (JP) . | |
| 5322083 | | 12/1993 | (JP) . | |

\* cited by examiner

*Primary Examiner*—Eric K. Nicholson
(74) *Attorney, Agent, or Firm*—Barry R. Lipsitz

(57) ABSTRACT

The present invention is directed to a down-sizable fitting for transferring a high-temperature, high-pressurized special chemical fluid which should be under strict control used in a high technology field or industry. A fitting according to the invention comprises a fastener (9) engaging a two-plied section including a folded-back portion (1c) which is formed such that one end section of a tube (1) is folded or turned back outwardly, and a fitting body (4) for fitting into the fastener (9, 11);

the fastener (9, 11) having an engaging portion (9c) for receiving said two-plied section of the tube (1), a contact portion (9b) for contact with the outer surface of the folded-back portion (1c) of the tube (1), and a threaded portion (9d) formed on the inner surface thereof;

the engaging portion (9c), the contact portion (9b) and the threaded portion (9d) are axially aligned;

the fitting body (4) including a cylindrical section (4a) which has an end for abutting against the U-shaped end (1c) of the two-plied section of the tube (1), the cylindrical section (4a) provided at the outer surface thereof with a threaded portion (4b).

8 Claims, 7 Drawing Sheets

TUBE-CONNECTING FITTING AND FITTING STRUCTURE

BACKGROUND OF THE INVENTION

1. Field of the Invention

The present invention generally relates to a fitting or a fitting structure of a synthetic resinous material mainly used in a tubing system in a high technology field or industry such as fabrication of semiconductors, for example, for transferring a high-temperature, high-pressurized special chemical fluid which should be under strict control because of its environmental impact, for example.

2. Prior Art

There are known fitting structures for plastic pipes or tubes, which use fluid-tight screws, ferrules, or a variety of other fluid-tight structures. Because of inherent natures of fluoroplastics, fitting structures made of a fluoroplastic material, for example, TFE (tetrafluoroethylene), PFA (copolymer of polytetrafluoroethylene and perfluoroalkylvinylether), or FEP (copolymer of polytetrafluoropropylene), are often used for transferring high-temperature, high-pressurized chemical fluids, particularly chemical liquids which need careful handling. However, conventional fluoroplastic fitting structures involve the problem of leakage of fluids. Namely, these fitting structures repeatedly experience expansion and contraction during the heat cycle, and creeps are produced in the fitting structures. These creeps result in making microscopic gaps between connected elements, and this is a major reason of the leakage problem. It is extremely difficult to prevent these gaps from being made.

To solve the problem a tube fitting as shown in FIG. 7 has been proposed. The prior art fitting shown in FIG. 7 is used for connecting a tube to an associated device, for example. In FIG. 7, the reference numeral 1 represents a tube made of a fluoroplastic material. One end or a forward end section of the tube 1 is folded back to outwardly overlap the remainder main portion of the tube 1 to form a folded-back portion of a predetermined length. As a result, the tube 1, in the folded shape, defines a folded-back end which is U-shaped in its cross section.

A fitting for connecting the tube 1 is made up of an insert 10, a fitting body 6 and a ring member 8 which are all made of a fluoroplastic material.

The insert 10 has a tubular shape and it is mounted on the tube 1 such that one end section (lower end section in FIG. 7) of the insert 10 sits between the main body of the tube 1 and the foldedback portion thereof.

The fitting body 6 includes an annular groove 6a whose bottom is U-shaped in its cross section to fit the U-shaped forward end of the tube 1; a cylindrical portion 6c encircling the annular groove 6a to define an inner wall surface 6b for contact with the outer wall of the folded-back portion of the tube 1 and an outer wall surface threaded to form a threaded portion 6f; and a connecting portion 6e threaded on its outer circumferential surface to form a threaded portion 6d for connecting the fitting body 6 to an associated device or apparatus.

The ring member 8 includes an inner ring portion 8a for engagement with the other end (upper end in FIG. 7) of the insert 10, and an outer cylindrical portion 8b whose inner wall surface is threaded to form a threaded portion 8c for threading engagement with the threaded portion 6f of the fitting body 6.

For fabricating the fitting structure, one end section of the tube 1 is first folded back outwardly by a predetermined length, and the insert 10 is inserted between the main portion and the folded-back portion of the tube 1. Then, the semi-assembly of the tube 1 and the insert 10 is joined to the fitting body 6. After that, the portion 6f of the fitting body 6 is threadedly engaged with the portion 8c of the ring member 8 until the insert 10 tightly compresses the U-shaped forward end of the tube 1 onto the annular groove 6a of the fitting body 6.

As a result, the tube 1 is firmly connected to the fitting, and the above-mentioned leakage problem is removed.

However, the prior art fitting structure is bulky in diameter because of the radially overlapped arrangement of the insert 10, the cylindrical portion 6c of the fitting body 6 and the outer cylindrical portion 8b of the ring member 8 around the tube 1 with threads being formed on the portions 6c and 8b for firm engagement between the fitting body 6 and the ring member 8. With the prior art fitting, the diametrical bulkiness of the fitting will make it impossible to arrange a plurality of tubes closely side by side for connection with the associated device.

SUMMARY OF THE INVENTION

The invention overcomes the above-mentioned problems by providing a fitting for connecting one tube to another tube or an associated device, said fitting comprising a fastener for engagement a two-plied section including a folded-back portion which is formed by folding or turning back one end section of said tube outwardly, and a fitting body for fitting into said fastener;

said fastener having an engaging portion for receiving said two-plied section of said tube, a contact portion for contact with the outer surface of said folded-back portion of said tube, and a threaded portion formed on the inner surface thereof;

said engaging portion, said contact portion and said threaded portion being axially aligned;

said fitting body including a cylindrical section which has an end for abutting against the U-shaped end of said two-plied section of said tube, said cylindrical section being provided with a threaded portion on the outer surface thereof.

The fitting according to the invention may include a insert having one end section to be inserted between the main body of the tube and the folded-back portion in the two-plied section. In this case, the fastener preferably has an engaging portion which is engageable with the other end of the insert.

According to the fitting of the invention, since the threaded portion is arranged axially offset from the engaging portion and the contact portion, it is possible for the fastener to have a decreased outer diameter in comparison with the prior art fitting.

BRIEF DESCRIPTION OF THE DRAWINGS

The below detailed description makes reference to the accompanying drawings, in which.

DETAILED DESCRIPTION OF THE PREFERRED EMBODIMENTS

Figure 1:
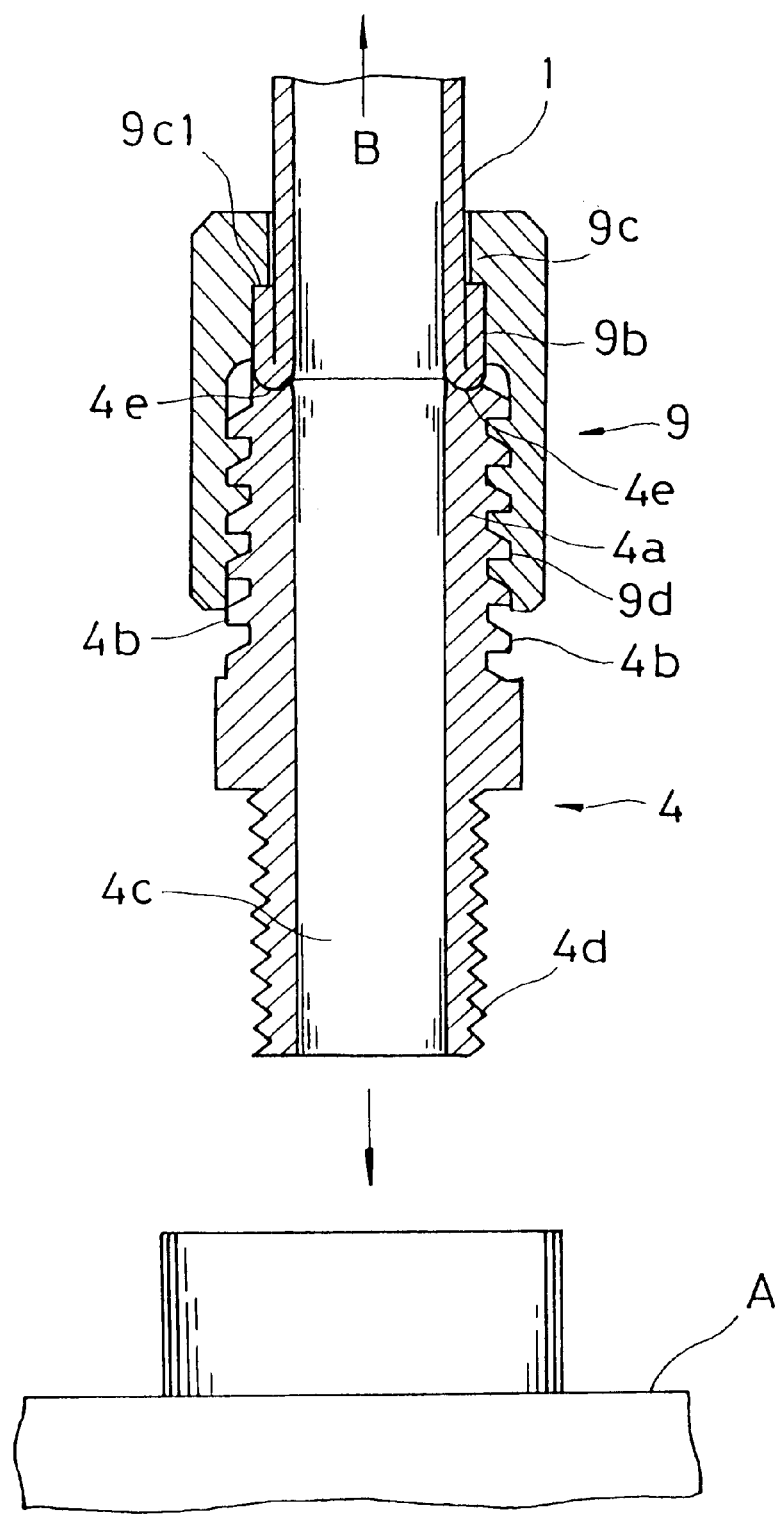
FIG. 1 is a cross-sectional view of a fitting structure according to the first embodiment of the invention.

Referring to the drawings attached, preferred embodiments of the invention will be described below.

Figure 2:
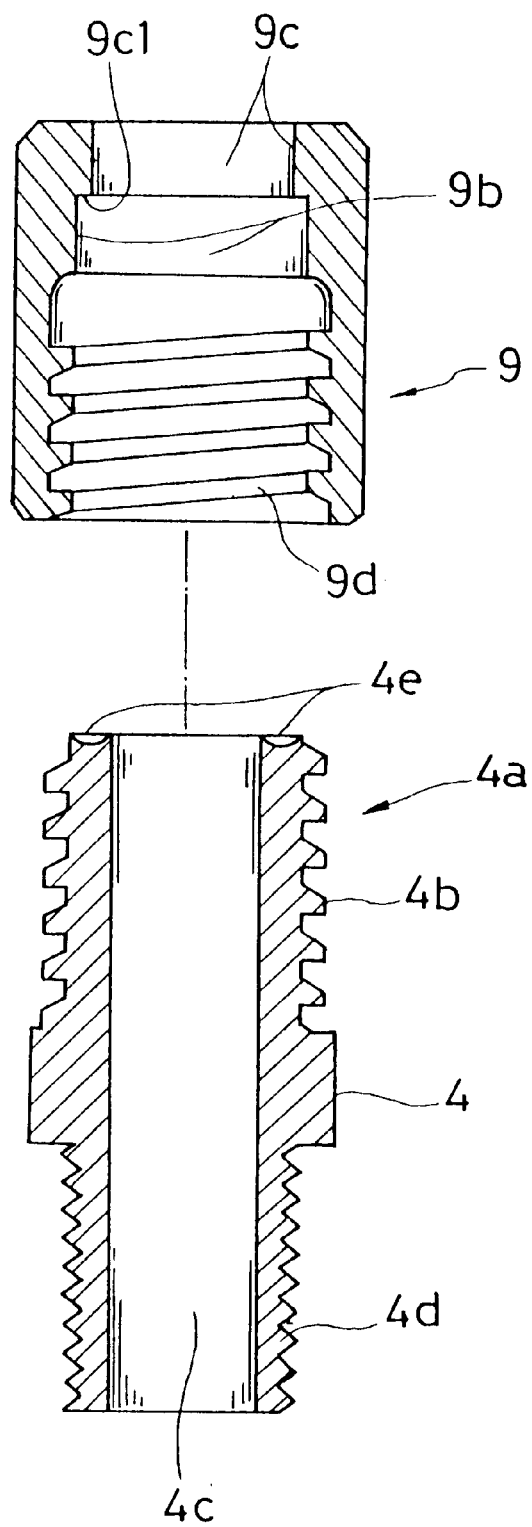
FIG. 2 is an exploded, cross-sectional view of a fitting shown in FIG. 1.

FIGS. 1 and 2 illustrate a first embodiment of the invention. In FIG. 1, the reference numeral 1 represents a tube of a fluoroplastic material, one end section of which is folded or turned back outwardly to form a predetermined length of U-shaped two-plied section.

A fitting for connecting the tube 1 includes a fitting body 4 and a fastener 9, which are made of a fluoroplastic material. The fastener 9 has a cylindrical shape including an upper opening, as shown in FIG. 2, through which the tube 1 is set. In FIGS. 1 and 2, the reference numeral 9c represents an engaging portion of the fastener 9. The engaging portion 9c includes an interior surface, the inner diameter of which is substantially equal to the outer diameter of the tube 1.

The reference numeral 9b indicates a contact portion positioned just below the engaging portion 9c. The contact portion 9b has an inner diameter which is substantially equal to the outer diameter of the folded-back portion 1c of the tube 1 and has a length which is substantially equal to that of the folded-back portion 1c.

As seen from the above, the engaging portion 9c is formed so as to protrude inwardly by a distance substantially equal to the thickness of the tube 1 to define a circumferential step 9c1 between the engaging portion 9c and the contact portion 9b.

As shown in FIG. 1, the fastener 9 is set and positioned at the folded-back portion 1c of tube 1 by using the engaging portion 9c and the contact portion 9b thereof. That is, since the contact portion 9b has the inner diameter and the length which are substantially equal to those of the folded-back portion 1c of the tube 1, the fastener 9 is closely fitted onto the outer surface of the folded-back portion 1c of the tube 1. And also, the engaging portion 9c, which has the inner diameter substantially equal to the outer diameter of the tube 1, can prevent the tube 1 from moving in a direction indicated by the arrow B in FIG. 1 because the end 1d of the folded-back portion 1c abuts against the step 9c1.

The reference numeral 9d represents a threaded portion positioned just below the contact portion 9b. The threaded portion 9d is threadedly engageable with a threaded portion formed on the fitting body 4, which threaded portion of the fitting body 4 will be described below.

The threaded portion 9d is located at such a place that when the fastener 9 is set on the tube 1, the threaded portion 9d is positioned in front of the two-plied section of the tube 1 (below the folded section of the tube 1 in FIG. 1). Namely, as shown in FIG. 1, the tubular fastener 9 is designed so that the engaging portion 9c, the contact portion 9b and the threaded portion 9d are axially aligned and located adjacently, respectively. In other words, the inner surface of the tubular fastener 9 is provided at the upper area thereof with the engaging portion 9c, at the central area with the contact portion 9b, and at the lower area with the threaded portion 9d, and the portions 9c, 9b and 9d are located adjacently, respectively.

Figure 7:
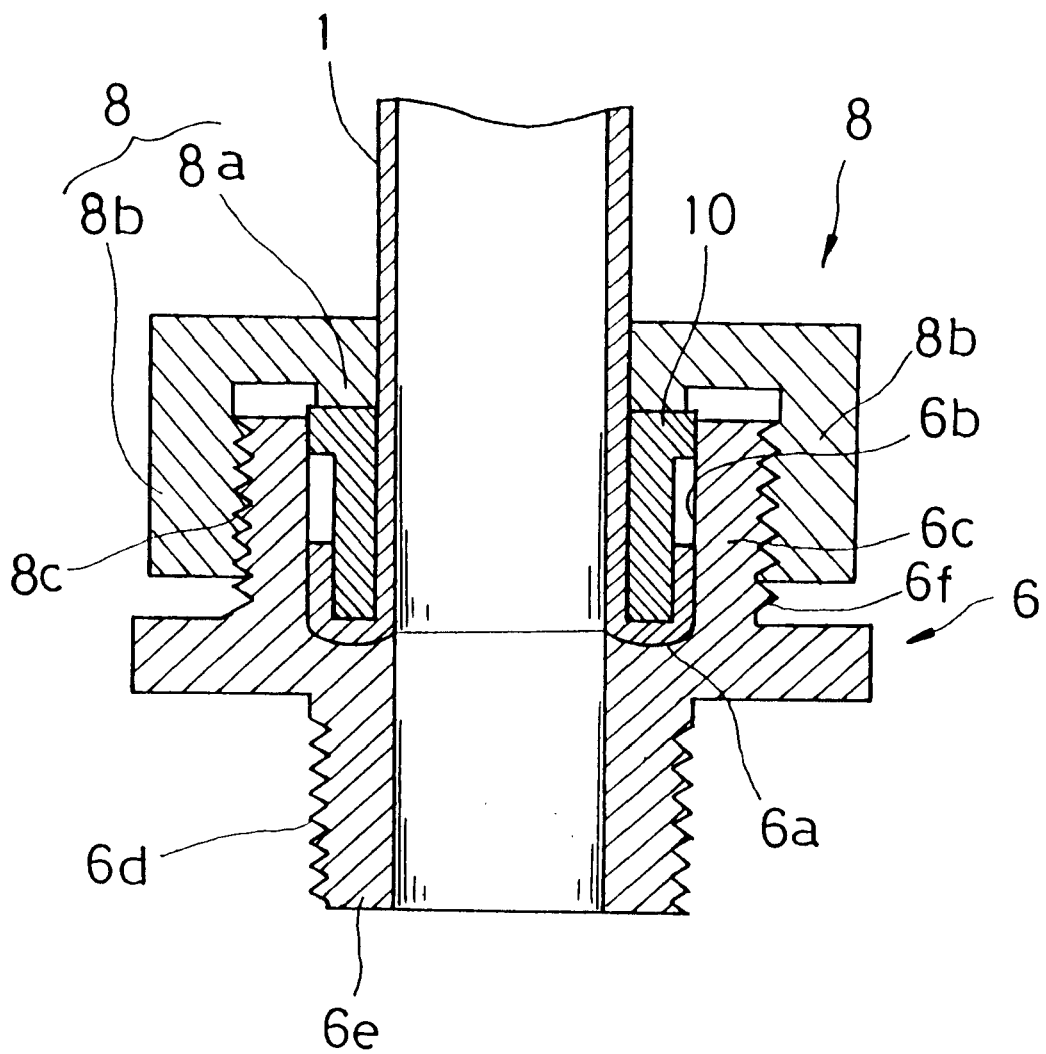
FIG. 7 is a cross-sectional view of a conventional fitting structure.

As seen from the above, the threaded portion 9d is arranged axially offset from the engaging portion 9c and the contact portion 9b, and it is therefore possible for the fastener 9 to have a decreased outer diameter in comparison with that of the ring member 8 shown in FIG. 7. Namely, it is necessary in the prior art fitting to consider the sum of the outer diameter of the tube 1, thicknesses of the tubular insert 10, the folded-back portion 1c of the tube 1, the ring portion 6c of the fitting body 6 and the outside ring portion 8b of the ring member 8 in order to determine an outer diameter of the ring member 8. In contrast, an outer diameter of the fastener 9 according to the invention is determined in consideration for the sum of the outer diameter of the tube 1 and thicknesses of the fastener 9 and the folded-back portion 1c thereof. As a result, the fastener 9 according to the present invention can be designed to have an outer diameter smaller than that of the prior art ring member 8.

Referring again to FIG. 1, the fitting body 4 is of an cylindrical shape and defines an axially straight passage 4c passing therethrough for a flow of chemical liquid which should be under strict control. An inner diameter of the passage 4c is designed to be substantially the same as the inner diameter of the tube 1. And also, the fitting body 4 has an upper end for contact with the tube 1. The upper end of the fitting body 4 has formed an annular groove 4e which is U-shaped in its cross section. The annular groove 4e is adapted to receive the U-shaped end 1a of the tube 1 to make a seal therebetween for preventing leakage of a liquid.

The width of the upper end of the fitting body 4 is substantially the same as the thickness of the two-plied section of the tube 1. This causes the upper end of the fitting body 4 to be closely fitted on the U-shaped end 1a of the tube 1. The fitting body 4 has a cylindrical section 4a whose outer surface forms a threaded portion 4b. The threaded portion 4b is adapted to threadedly engage with a threaded portion 9d of the fastener 9.

As shown in FIGS. 1 and 2, the fitting body 4 has a connecting section 4d which is formed integrally with the cylindrical section 4a. The connecting section 4d is provided on the outer surface thereof with a threaded portion by which the fitting body 4 can be connected to an associated device A such as a pump.

A process to make up the fitting structure according to the first embodiment of the invention will be described below.

First, as shown in FIG. 1, one end section of the tube 1 is folded or turned back by a predetermined length thereof to make the folded-back portion 1c. The length of the folded-back portion 1c is substantially the same as that of the contact portion 9b of the fastener 9. Next, the fastener 9 is set on the tube 1. The operation to set the fastener 9 on the tube 1 is performed as follows. First, the other end of the tube 1 is faced to an opening of the threaded portion 9d of the fastener 9. Next, the tube 1 is inserted into the fastener 9 from the threaded portion 9d. After that, the tube 1 is abutted with its end 1d of the folded-back portion 1c against the step 9c 1 of the fastener 9.

After the operation, the threaded portion 4b of the fitting body 4 is threadedly engaged with the threaded portion 9d of the fastener 9 to compress the end 1a of the U-shaped two-plied section of the tube 1 onto the U-shaped groove 4e of the fitting body 4. As a result of the above operation, the fitting structure including the tube 1 is completed.

As described above, the flow passage 4c of the fitting body 4 has the inner diameter which is substantially the same as that of the tube 1. Therefore, once the fitting body 4 is firmly fixed to the tube 1, a smooth path is formed between the fitting body 4 and the tube 1. Namely, no gap is made along junction between the fitting body 4 and the tube 1, causing a liquid to smoothly pass throughout the actual length of the fitting body 4 and the tube 1.

Figure 3:
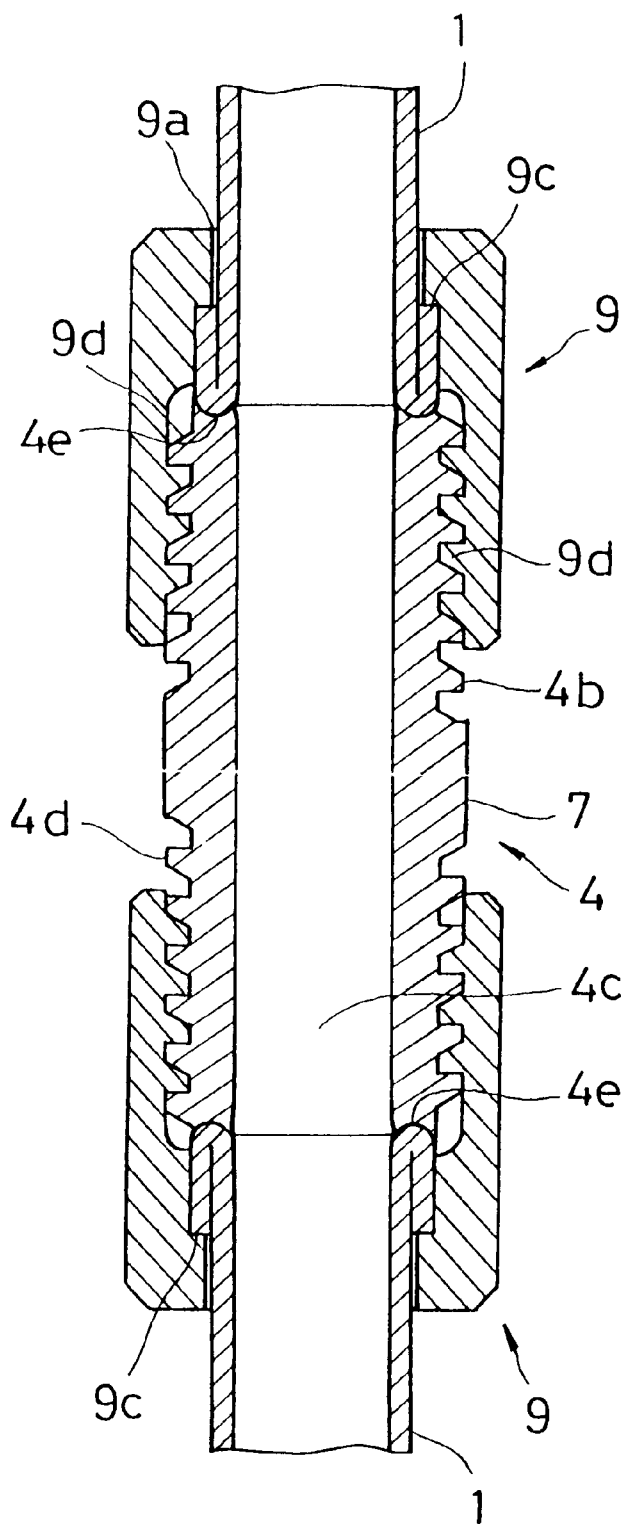
FIG. 3 is a cross-sectional view of a fitting structure according to the second embodiment of the invention.

FIG. 3 is a sectional view illustrating a fitting structure according to the second embodiment of the invention. In FIG. 3, identical elements to the first embodiment are indicated by the same reference numerals. As seen from FIG. 3, the fitting according to the second embodiment has such a configuration as to be lengthwise symmetrical with respect to a central portion 7 and is adapted to be used for connection of two tubes 1 and 1.

Figure 4:
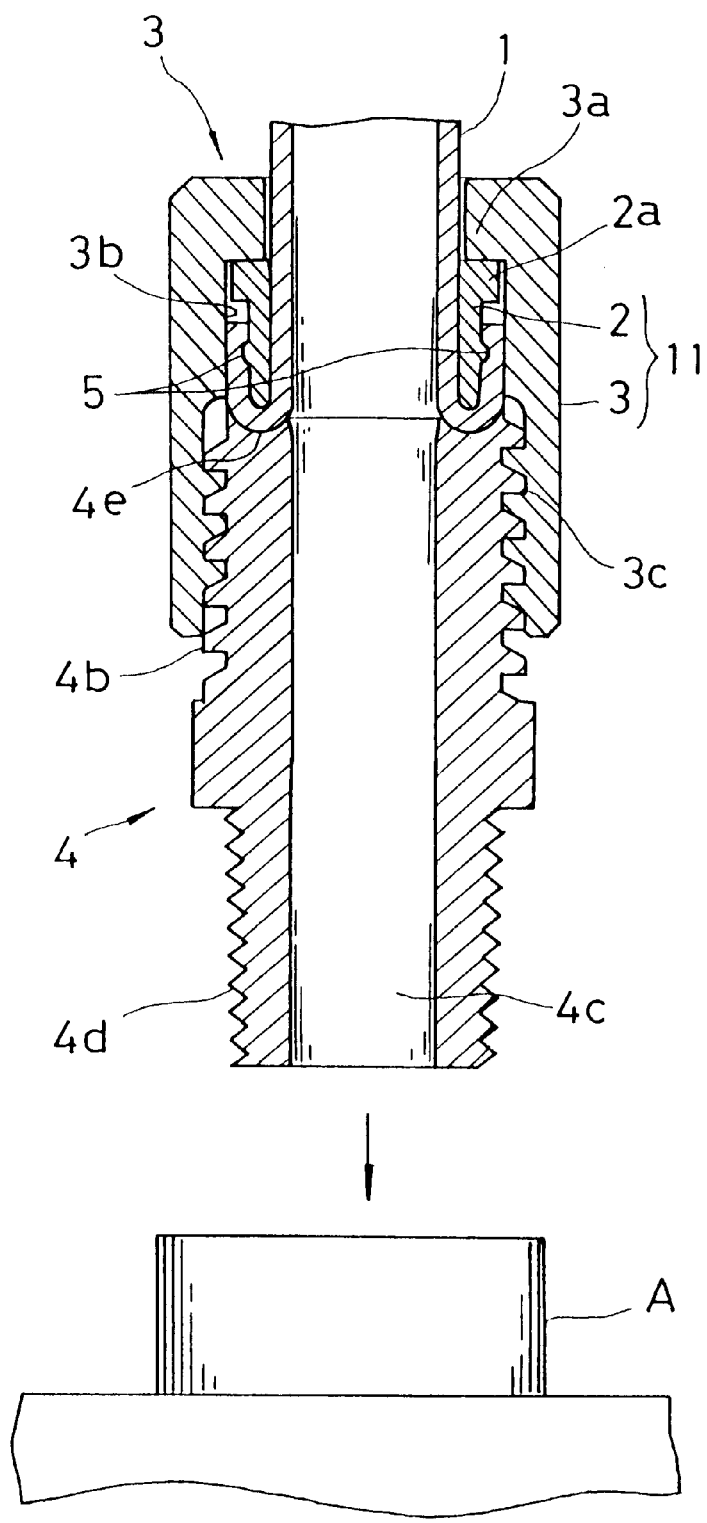
FIG. 4 is a cross-sectional view of a fitting structure according to the third embodiment of the invention.
Figure 5:
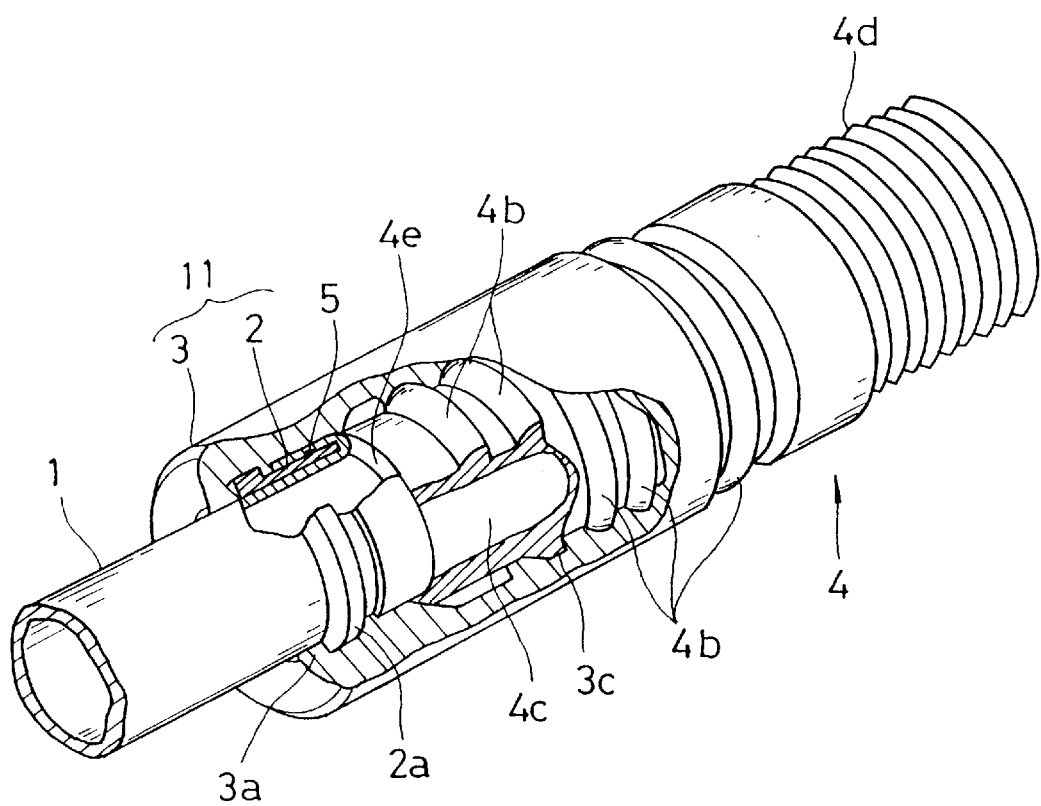
FIG. 5 is a perspective view of the fitting structure shown in FIG. 4, partly cut out to show the interior structure.

FIGS. 4 and 5 illustrate a fitting structure according to the third embodiment of the invention. In the drawings, the reference numeral 1 indicates a tube, which has the folded-back portion 1c as hereinbefore described in the first embodiment.

A fitting to be connected to the tubes 1 includes a fitting body 4 and a fastener 11. The fastener 11 comprises an inserts 2 which is partially inserted between the main body of the tube 1 and the folded-back portion 1c thereof, and a fastener body 3 which has an engaging portion 3a abutting against the other end of the insert 2.

The insert 2 is made of a fluoroplastic material and has a tubular shape, the inner diameter of which is designed to be substantially the same as the outer diameter of the tube 1 as best shown in FIG. 4. As shown in FIG. 4, the insert 2 is set on the two-plied section of the tube 1 such that one end section (lower end in FIG. 4) of the insert 2 sits between the main body of the tube 1 and the folded-back portion 1c. Consequently, the width of the two-plied section of the tube 1 is enlarged by the width of the insert 2.

The insert 2 has, at the other end thereof, a flange 2a extending circumferentially and outwardly. The flange 2a is adapted to come into contact with the under surface of the engaging portion 3a and with the inner surface of the fastener body 3, causing the fastening force by the fastener body 3 and the fitting body 4 to be adequately transmitted to the two-plied section of the tube 1.

In addition to the flange 2a, the insert 2 is provided on the outer surface thereof with a ridge 5 which extends circumferentially and outwardly. The circumferential ridge 5 forces the folded-back portion 1c of the tube 1 outwardly and presses it against the fastener body 3 into intimate contact therewith.

The fastener body 3 is substantially the same in structure as the fastener body 9 of FIGS. 1 and 2 except the width thereof, namely the outer diameter of the fastener body 3 is designed to be slightly larger than that of the fastener body 9 in consideration for the enlarged width of the two-plied section of the tube 1 by insertion of the insert 4 into the two-plied section.

The engaging portion 3a has such a shape as to extend in the radially inward direction to abut against the flange 2a of the insert 2.

The fitting body 4 is substantially the same in structure as the fitting body 4 shown in FIGS. 1 and 2, but the width of the end having the annular groove 4e or the thickness of the fitting body 4 is larger than that of the fitting body 4 according to the first embodiment. Namely, since the width of the U-shaped two-plied section of the tube 1 is enlarged by the thickness of the insert 2 which is set on the U-shaped two-plied section, taking it into consideration, the thickness of the fitting body 4 according to the third embodiment is designed to be larger than that of the fitting body 4 according to the first embodiment.

A process to make up the fitting structure according to the third embodiment of the invention will be described below:

First, one end section of the tube 1 is folded or turned back by a predetermined length thereof. The length to be folded back is determined so that the end 1d of the folded-back portion 1c can be positioned apart from the flange 2a of the insert 2 to define a small gap between the end 1d and the flange 2a. Next, the insert 2 is inserted between the main body of the tube 1 and the folded-back portion 1c to sit on the two-plied section of the tube 1. Then, the other end of tube 1 is faced to the threaded portion 3c of the fastener body 3 to insert the tube 1 into the fastener body 3. After that, the flange 2a of the insert 2 is abutted against the engaging portion 3a of the fastener body 3. As a result of the above operation, it is completed to assemble the tube 1 and the fastener body 3. Thereafter, the threaded portion 4b of the fitting body 4 is threadedly engaged with the threaded portion 3c of the fastener body 3 and the end 1a of the tube 1 comes into contact with the groove 4e of the fitting body 4. The fastener body 3 is further threaded into the fitting body 4 to compress the end 1a of the tube 1 against the groove 4e of the fitting body 4.

The fitting structure according to the third embodiment defines a larger contact area between the tube 1 and the annular groove 4e of the fitting body 4 than those of the fitting structures according to the first and second embodiments, and ensures more reliable sealing between the tube 1 and the fitting.

Figure 6:
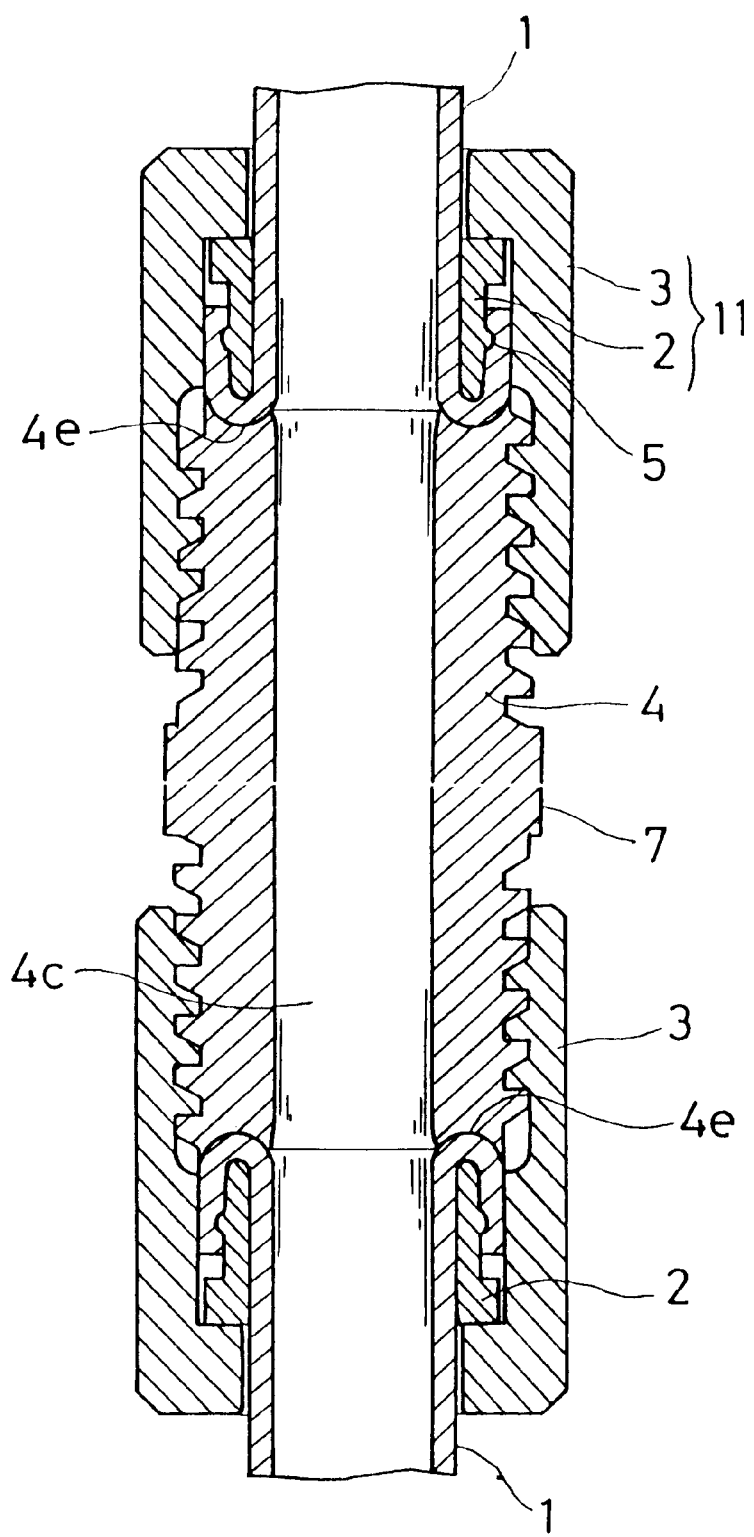
FIG. 6 is a cross-sectional view of a fitting structure according to the fourth embodiment of the invention.

FIG. 6 is a fitting structure according to the forth embodiment of the invention, which is adapted to connect two tubes 1 and 1.

The fitting structure shown here is symmetric in its lengthwise direction about its own center 7, and the insert 2, the fastener 3 and the fitting body 4 are identical to those of the third embodiment.

What is claimed is:

1. A fitting for connecting one tube to another tube or an associated device, said fitting comprising a fastener for engagement of a two-plied section of the tube including a folded back portion which is formed by folding or turning back one end section of said tube outwardly onto itself and forming a U-shaped end, and a fitting body for fitting into said fastener;

said fastener having an engaging portion for receiving said two-plied section of said tube, a contact portion for contact with the outer surface of said folded-back portion of said tube, and a threaded portion formed on the inner surface thereof;

said engaging portion, said contact portion and said threaded portion being axially aligned and located adjacent to each other respectively, providing a narrow outer fitting diameter;

said fitting body including a cylindrical section which has an end for abutting against the U-shaped end of said two-plied section of said tube;

said fitting body being axially aligned with said tube body and providing a smooth straight passage through the tube and the fitting body; and said cylindrical section being provided with a threaded portion on the outer surface thereof.

2. A fitting according to claim 1 wherein said end of said fitting body is provided with an annular groove for receiving the U-shaped end of said folded section of said tube.

3. A fitting according to claim 1 or 2 wherein said fastener includes an insert having one end section to be inserted between a main body of said tube and the folded-back portion in said two-plied section, and a fastener body having said engaging portion, said contact portion and said threaded portion, said engaging portion being engageable with the other end of said insert.

4. A fitting according to claim 3 wherein said insert has a circumferential ridge on outer surface thereof for urging said folded-back portion of said tube outwardly.

5. A fitting structure comprising:

a tube;

a fastener for receiving said tube; and a fitting body fitting into said fastener;

said tube having a two-plied section including a predetermined length of a folded-back portion which is formed by folding or turning back one end section of said tube outwardly onto itself and forming a U-shaped end;

said fastener having an engaging portion for receiving said two-plied section of said tube, a contact portion for contact with the outer surface of said folded-back portion of said tube, and a threaded portion formed on the inner surface thereof, said engaging portion, said contact portion and said threaded portion being axially aligned and located adjacent to each other respectively, providing a narrow outer fitting diameter;

said fitting body including a cylindrical section which has an end for abutting against the U-shaped end of said two-plied section of said tube;

said fitting body being axially aligned with said tube body and providing a smooth straight passage through the tube and the fitting body; and said cylindrical section being provided with a threaded portion on the outer surface thereof.

6. A fitting structure according to claim 5 wherein said end of said fitting body is provided with an annular groove for receiving the U-shaped end of said two-plied section of said tube.

7. A fitting structure according to claim 5 or 6 wherein said fastener includes an insert having one end section which is inserted between a main body of said tube and the folded-back portion in said two-plied section, and a fastener body having said engaging portion, said contact portion and said threaded portion, said engaging portion being engageable with the other end of said insert.

8. A fitting structure according to claim 7 wherein said insert has a circumferential ridge on outer surface thereof for urging said folded-back portion of said tube outwardly.

* * * * *